(12) United States Patent
Dales et al.

(10) Patent No.: US 12,274,201 B2
(45) Date of Patent: Apr. 15, 2025

(54) STRING TRIMMER

(71) Applicant: MILWAUKEE ELECTRIC TOOL CORPORATION, Brookfield, WI (US)

(72) Inventors: Hugh A. Dales, Germantown, WI (US); Mitchell E. Carpenter, Milwaukee, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 809 days.

(21) Appl. No.: 17/351,588

(22) Filed: Jun. 18, 2021

(65) Prior Publication Data

US 2021/0392812 A1     Dec. 23, 2021

Related U.S. Application Data

(60) Provisional application No. 63/041,625, filed on Jun. 19, 2020.

(51) Int. Cl.
| | | |
|---|---|---|
| *A01D 34/58* | (2006.01) | |
| *A01D 34/00* | (2006.01) | |
| *A01D 34/416* | (2006.01) | |
| *A01D 34/90* | (2006.01) | |
| *H02K 9/06* | (2006.01) | |

(Continued)

(52) U.S. Cl.
CPC .......... *A01D 34/58* (2013.01); *A01D 34/006* (2013.01); *A01D 34/416* (2013.01); *A01D 34/90* (2013.01); *H02K 9/06* (2013.01); *H02K 11/21* (2016.01); *H02K 11/33* (2016.01); *H02K 2203/03* (2013.01)

(58) Field of Classification Search
CPC .... A01D 34/58; A01D 34/006; A01D 34/416; A01D 34/90; H02K 11/21; H02K 11/33; H02K 9/06
See application file for complete search history.

(56) References Cited

U.S. PATENT DOCUMENTS

| 4,211,004 A | 7/1980 | Woods |
|---|---|---|
| 4,237,610 A | 12/1980 | Bradus et al. |

(Continued)

FOREIGN PATENT DOCUMENTS

| CN | 2847829 Y | 12/2006 |
|---|---|---|
| CN | 2847830 Y | 12/2006 |

(Continued)

OTHER PUBLICATIONS

International Search Report and Written Opinion for Application No. PCT/US2021/038032 dated Oct. 1, 2021 (11 pages).

(Continued)

*Primary Examiner* — Omar Flores Sanchez
(74) *Attorney, Agent, or Firm* — Dority & Manning, P.A.

(57) ABSTRACT

A string trimmer includes a handle unit including a handle unit housing that defines a grip portion and a battery receptacle. The string trimmer also includes a head unit including a head unit housing, an electric motor, and a rotatable trimmer head. The string trimmer further includes a shaft assembly coupling the handle unit to the head unit. The string trimmer also includes a circuit board assembly supported within the head unit housing. The circuit board assembly includes a heat sink and a circuit board that comprises a controller configured to control the electric motor.

20 Claims, 8 Drawing Sheets

(51) Int. Cl.
*H02K 11/21* (2016.01)
*H02K 11/33* (2016.01)

(56) References Cited

U.S. PATENT DOCUMENTS

| | | |
|---|---|---|
| 4,245,454 A | 1/1981 | Zien |
| 4,268,964 A | 5/1981 | Moore |
| 4,360,971 A | 11/1982 | Fellmann |
| 4,668,898 A | 5/1987 | Harms et al. |
| 4,756,148 A | 7/1988 | Gander et al. |
| 4,790,071 A | 12/1988 | Helmig et al. |
| 4,794,695 A | 1/1989 | Hurst |
| 5,881,464 A | 3/1999 | Collins et al. |
| 5,881,465 A | 3/1999 | Brant et al. |
| 5,932,942 A | 8/1999 | Patyk et al. |
| 5,939,807 A | 8/1999 | Patyk et al. |
| 6,014,812 A | 1/2000 | Webster |
| 6,104,112 A | 8/2000 | Vanjani |
| 6,263,975 B1 | 7/2001 | Rosa et al. |
| 6,301,788 B1 | 10/2001 | Webster |
| 6,320,286 B1 | 11/2001 | Ramarathnam |
| 6,577,030 B2 | 6/2003 | Tominaga et al. |
| 6,848,245 B2 | 2/2005 | Hancock et al. |
| 6,949,849 B1 | 9/2005 | Wright et al. |
| 7,042,122 B1 | 5/2006 | Dufala et al. |
| 7,064,462 B2 | 6/2006 | Hempe et al. |
| 7,102,318 B2 | 9/2006 | Miura et al. |
| 7,330,006 B2 | 2/2008 | Iwata et al. |
| 7,521,826 B2 | 4/2009 | Hempe et al. |
| 8,256,120 B2 | 9/2012 | Million et al. |
| 8,405,260 B2 | 3/2013 | Takeyama et al. |
| 8,573,323 B2 | 11/2013 | Muller et al. |
| 8,659,193 B2 | 2/2014 | Yamasaki et al. |
| 9,049,816 B2 | 6/2015 | Ito et al. |
| 9,160,207 B2 | 10/2015 | Zeng et al. |
| 9,379,596 B2 | 6/2016 | Kraetzig |
| 9,450,471 B2 | 9/2016 | Mergener et al. |
| 9,472,992 B2 | 10/2016 | Shaffer |
| 9,517,555 B2 | 12/2016 | Racov et al. |
| 9,730,382 B2 | 8/2017 | Proudlock |
| 9,770,821 B2 | 9/2017 | Racov et al. |
| 9,774,229 B1 | 9/2017 | Mergener et al. |
| 9,787,159 B2 | 10/2017 | Beyerl |
| 9,854,738 B2 | 1/2018 | Miller et al. |
| 9,872,429 B2 | 1/2018 | Ma et al. |
| 9,918,428 B2 | 3/2018 | Yamaoka et al. |
| 9,954,417 B2 | 4/2018 | Mergener et al. |
| 9,960,656 B2 | 5/2018 | Mergener et al. |
| 10,034,422 B2 | 7/2018 | Palermo |
| 10,149,434 B2 | 12/2018 | Martinsson |
| 10,177,691 B2 | 1/2019 | Eshleman et al. |
| 10,224,524 B2 | 3/2019 | Miller et al. |
| 10,264,725 B2 | 4/2019 | Guo et al. |
| 10,299,430 B2 | 5/2019 | Miller et al. |
| 10,314,228 B2 | 6/2019 | Ma et al. |
| 10,334,778 B2 | 7/2019 | Kullberg |
| 10,348,159 B2 | 7/2019 | Beyerl |
| 10,362,731 B2 | 7/2019 | Yamaoka |
| 2003/0067228 A1 | 4/2003 | Vanjani |
| 2005/0193707 A1 | 9/2005 | Hancock et al. |
| 2007/0205038 A1* | 9/2007 | Tominaga ............... H02K 11/33 180/444 |
| 2010/0313429 A1 | 12/2010 | Yamaoka et al. |
| 2010/0313430 A1 | 12/2010 | Yamaoka et al. |
| 2011/0056082 A1 | 3/2011 | Nie |
| 2012/0102755 A1 | 5/2012 | Racov et al. |
| 2013/0025135 A1 | 1/2013 | Gejervall et al. |
| 2014/0096988 A1 | 4/2014 | Hirabayashi et al. |
| 2014/0165521 A1 | 6/2014 | Morita |
| 2014/0165525 A1 | 6/2014 | Nagata |
| 2014/0182143 A1 | 7/2014 | Morita |
| 2014/0190713 A1 | 7/2014 | Martinsson et al. |
| 2014/0208598 A1 | 7/2014 | Morita et al. |
| 2014/0215835 A1 | 8/2014 | Racov et al. |
| 2014/0283392 A1 | 9/2014 | Mezher |
| 2015/0264861 A1 | 9/2015 | Kullberg |
| 2016/0088792 A1 | 3/2016 | Yamaoka et al. |
| 2016/0143219 A1 | 5/2016 | Yuan et al. |
| 2016/0183452 A1 | 6/2016 | Kullberg |
| 2016/0227694 A1 | 8/2016 | Bermudez |
| 2017/0120435 A1 | 5/2017 | Palich et al. |
| 2018/0035608 A1 | 2/2018 | Rethaber |
| 2018/0083510 A1 | 3/2018 | Purohit et al. |
| 2018/0084646 A1* | 3/2018 | Purohit ............... H05K 5/0073 |
| 2018/0092298 A1 | 4/2018 | Takahashi et al. |
| 2018/0098493 A1 | 4/2018 | Sergyeyenko et al. |
| 2018/0101661 A1 | 4/2018 | Longo et al. |
| 2018/0101662 A1 | 4/2018 | Longo et al. |
| 2018/0103584 A1 | 4/2018 | Orton |
| 2018/0192583 A1 | 7/2018 | Sergyeyenko et al. |
| 2018/0248446 A1 | 8/2018 | Mergener et al. |
| 2018/0262092 A1 | 9/2018 | Beyerl et al. |
| 2018/0271012 A1 | 9/2018 | Guo et al. |
| 2018/0279547 A1 | 10/2018 | Sergyeyenko et al. |
| 2018/0332766 A1 | 11/2018 | Ackerman et al. |
| 2018/0338374 A1 | 11/2018 | Li et al. |
| 2019/0006980 A1 | 1/2019 | Sheeks et al. |
| 2019/0023305 A1* | 1/2019 | Fujimoto ............. B62D 5/0406 |
| 2019/0044110 A1* | 2/2019 | Sheeks .................... H02K 5/20 |
| 2019/0090405 A1 | 3/2019 | Bermudez |
| 2019/0110396 A1 | 4/2019 | Bringhurst et al. |
| 2019/0148684 A1 | 5/2019 | Miller et al. |
| 2019/0199176 A1* | 6/2019 | Kanazawa ............. B62D 5/046 |
| 2019/0216013 A1 | 7/2019 | Guo et al. |
| 2019/0269069 A1 | 9/2019 | Boyles |
| 2020/0178462 A1 | 6/2020 | Yamaoka et al. |
| 2022/0166614 A1* | 12/2022 | Hara ........................ H02K 9/04 |
| 2024/0072614 A1* | 2/2024 | Kawano ............. H02K 11/0094 |
| 2024/0136894 A1* | 4/2024 | Tomioka ................ H02K 11/21 |

FOREIGN PATENT DOCUMENTS

| | | |
|---|---|---|
| CN | 201563384 U | 9/2010 |
| CN | 202679986 U | 1/2013 |
| CN | 102771247 B | 12/2014 |
| CN | 204069756 U | 1/2015 |
| CN | 104798526 A | 7/2015 |
| CN | 205142981 U | 4/2016 |
| CN | 205232798 U | 5/2016 |
| CN | 205430100 U | 8/2016 |
| CN | 206423132 U | 8/2017 |
| CN | 206423134 U | 8/2017 |
| CN | 105519300 B | 12/2017 |
| CN | 207521809 U | 6/2018 |
| CN | 207573927 U | 7/2018 |
| CN | 207626111 U | 7/2018 |
| CN | 105519301 B | 4/2019 |
| CN | 106416588 B | 8/2019 |
| CN | 110651588 A | 1/2020 |
| DE | 102017001553 A1 | 8/2018 |
| EP | 2216143 B1 | 1/2013 |
| EP | 3000300 B1 | 6/2018 |
| JP | 2012231804 A | 11/2012 |
| JP | 6441648 B2 | 12/2018 |
| JP | 6632883 B2 | 1/2020 |
| WO | 2009124697 A1 | 10/2009 |
| WO | 2012128004 A1 | 9/2012 |
| WO | 2014166341 A1 | 10/2014 |
| WO | 2018068324 A1 | 4/2018 |
| WO | 2018077231 A1 | 5/2018 |
| WO | 2018170906 A1 | 9/2018 |
| WO | 2019029335 A1 | 2/2019 |
| WO | 2019076083 A1 | 4/2019 |
| WO | 2019076354 A1 | 4/2019 |
| WO | 2019116120 A1 | 6/2019 |

OTHER PUBLICATIONS

Partial European Search Report Corresponding to U.S. Appl. No. 21/826,293 on May 24, 2024.

* cited by examiner

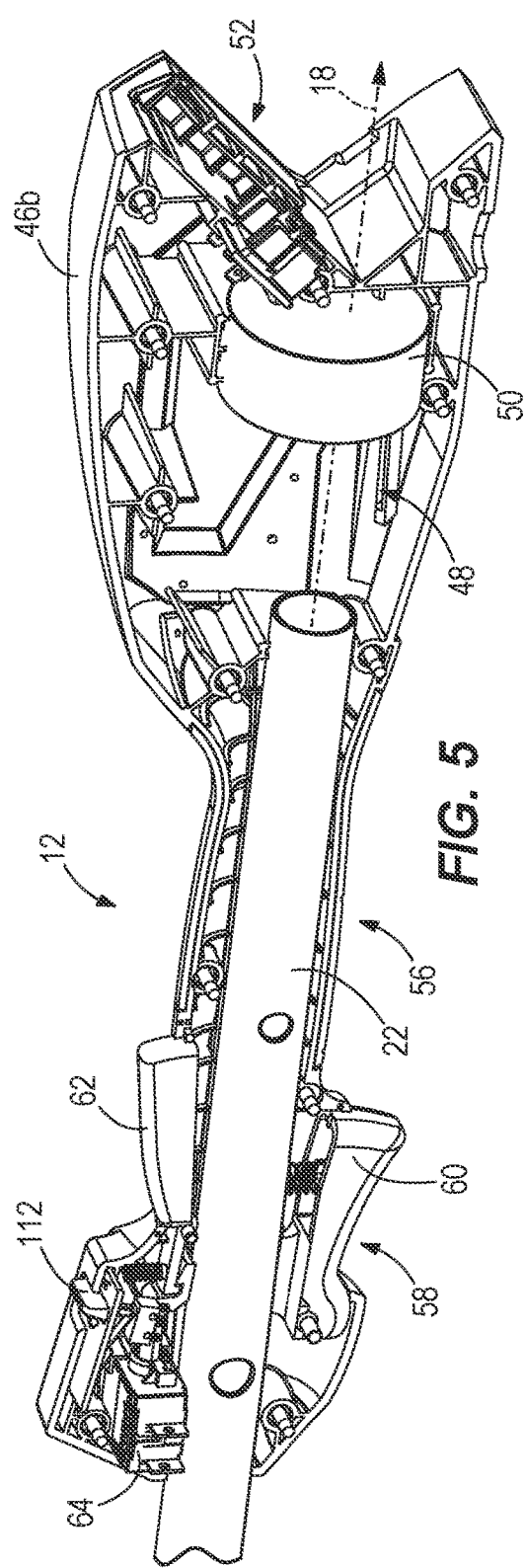
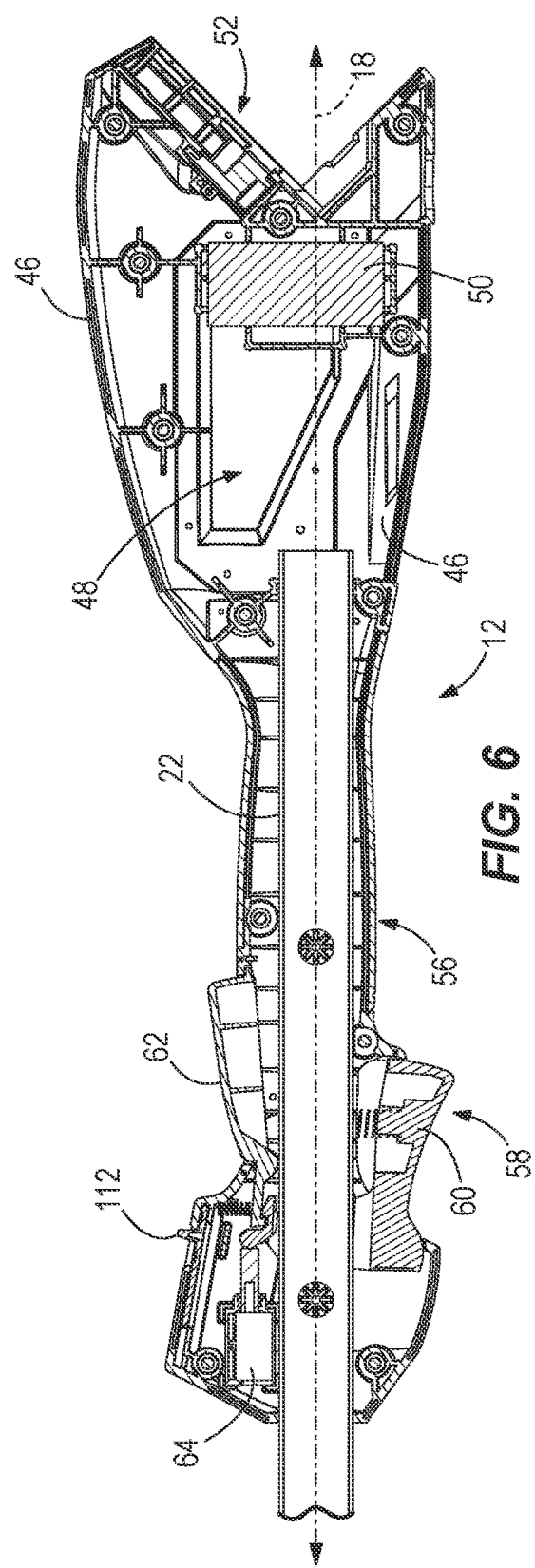

STRING TRIMMER

CROSS-REFERENCE TO RELATED APPLICATIONS

This application claims priority to co-pending U.S. Provisional Patent Application No. 63/041,625, filed Jun. 19, 2020, the entire content of which is hereby incorporated by reference.

FIELD OF THE DISCLOSURE

The present disclosure relates to outdoor tools, and more specifically to string trimmers.

BACKGROUND OF THE DISCLOSURE

Outdoor tools, such as string trimmers, may include an elongated shaft assembly extending between a handle unit and a head unit.

SUMMARY OF THE DISCLOSURE

The present disclosure provides, in one aspect, a string trimmer including a handle unit having a handle unit housing that defines a grip portion and a battery receptacle. The string trimmer also includes a head unit including a head unit housing, and electric motor, and a rotatable trimmer head. The string trimmer further includes a shaft assembly coupling the handle unit to the head unit. A circuit board assembly is supported within the head unit housing, the circuit board assembly including a heat sink and a circuit board that comprises a controller configured to control the electric motor.

The present disclosure provides, in another aspect, a string trimmer including a handle unit having a handle unit housing that defines a grip portion and a battery receptacle. The string trimmer also includes a head unit including a head unit housing and a rotatable trimmer head. The string trimmer further includes a shaft assembly coupling the handle unit to the head unit. The string trimmer also includes an electric motor supported within the head unit housing and configured to rotate the trimmer head, the electric motor including a rotor assembly, a stator assembly surrounding the rotor assembly, and a circuit board assembly coupled to an axial end of the stator assembly. The circuit board assembly includes a heat sink, a first circuit board located between the stator assembly and the heat sink, and a second circuit board located between the first circuit board and the stator assembly.

The present disclosure provides, in another aspect, a string trimmer including a handle unit having a housing that defines a grip portion and a battery receptacle. The string trimmer also includes a head unit including a rotatable trimmer head and a motor configured to rotate the trimmer head. The string trimmer further includes a shaft assembly extending along an axis between the handle unit and the head unit to couple the handle unit to the head unit. The string trimmer also includes a handle coupled to the shaft assembly between the handle unit and the head unit. The string trimmer further includes a counterweight disposed within the housing between the grip portion and the battery receptacle, wherein the axis intersects the counterweight.

The present disclosure provides, in another aspect, a string trimmer including a handle unit having a housing that defines a grip portion, a trigger assembly, and a mode selection shuttle switch movable between a first position and a second position. The string trimmer also includes a head unit including a rotatable trimmer head and a motor configured to rotate the trimmer head. The string trimmer further includes a shaft assembly coupling the handle unit to the head unit. When the mode selection shuttle switch is in the first position, the motor is configured to operate in a high speed mode corresponding to a first rotational speed of the trimmer head. When the mode selection shuttle switch is in the second position, the motor is configured to operate in a low speed mode corresponding to a second rotational speed of the trimmer head less than the first rotational speed.

Other features and aspects of the disclosure will become apparent by consideration of the following detailed description and accompanying drawings.

BRIEF DESCRIPTION OF THE DRAWINGS

FIG. 5 is a perspective view of the power head of FIG. 4 with portions removed.

FIG. 6 is a cross-sectional view of the power head of FIG. 4, taken along line 6-6 of FIG. 1.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
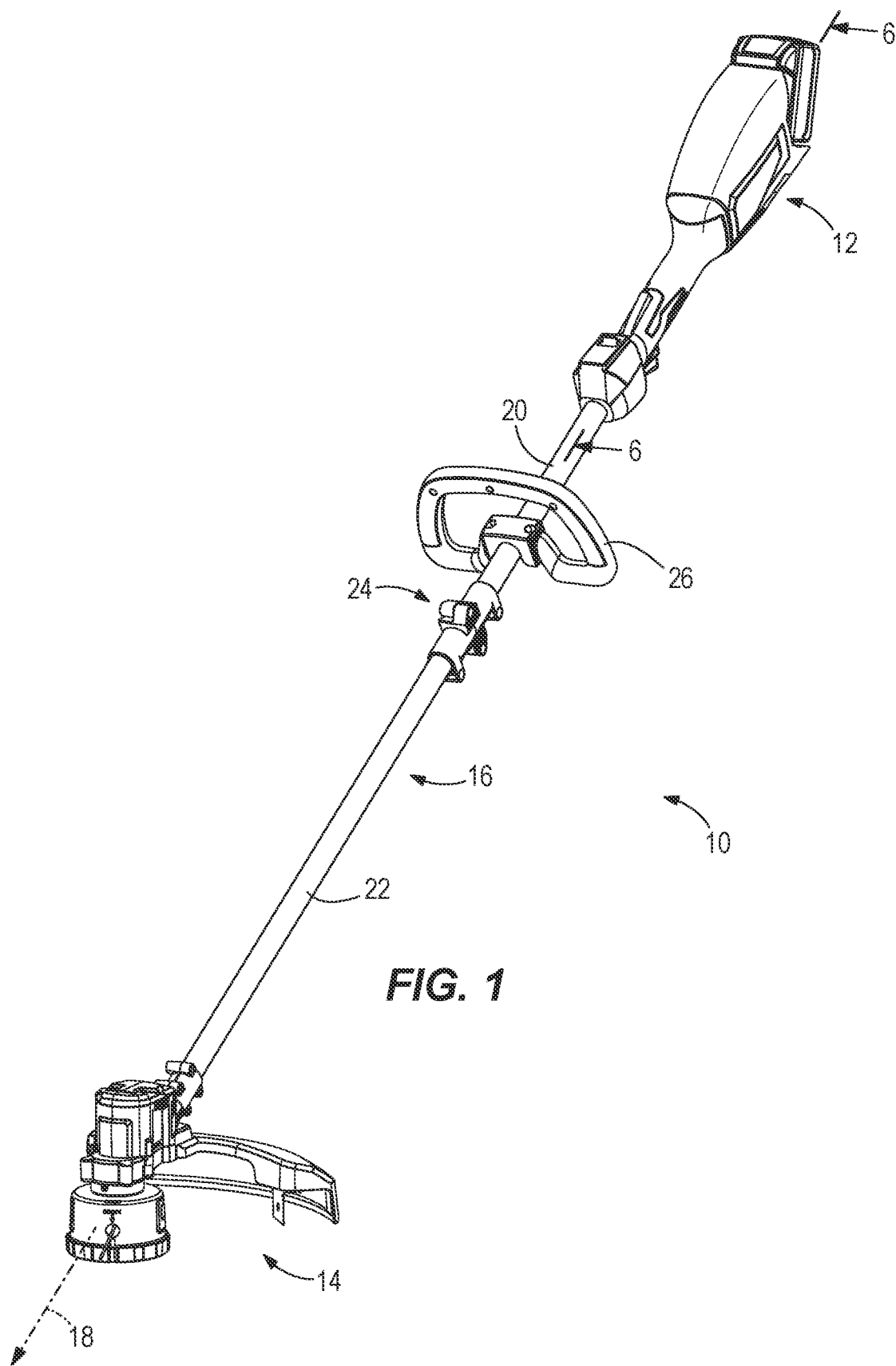
FIG. 1 is a perspective view of an outdoor tool, such as a string trimmer, according to one embodiment.
Figure 3:
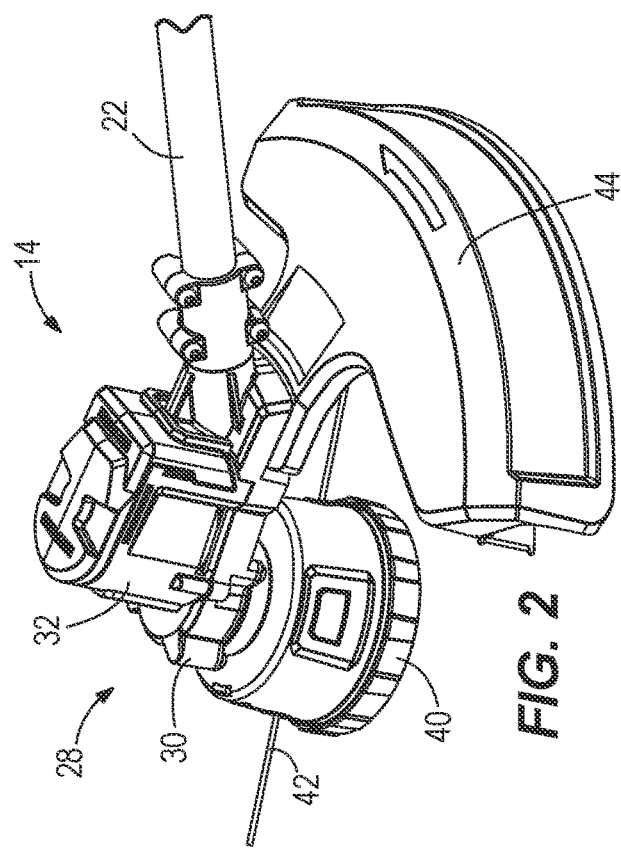
FIG. 3 is a perspective view of portions of the string trimmer of FIG. 1.

FIG. 1 illustrates an embodiment of an outdoor tool, such as a string trimmer 10, including a handle unit 12 and a head unit 14 detachably coupled to the handle unit 12 by an elongated shaft assembly 16 that extends along an axis 18. The shaft assembly 16 includes a first shaft segment 20 affixed to the handle unit 12, a second shaft segment 22 affixed to the head unit 14, and a coupler 24 including substantially identical coupling members 24*a*, 24*b* (FIG. 3) operable to couple the shaft segments 20, 22. A coupler of this type is described and illustrated, for example, in U.S. Provisional Patent Application No. 62/637,793, filed Mar. 2, 2018, entitled "COUPLER FOR A TOOL", and in corresponding U.S. patent application Ser. No. 16/280,799, filed Feb. 20, 2019, entitled "COUPLER FOR A TOOL", each of which is incorporated herein by reference in its entirety. The string trimmer 10 also includes a handle 26 coupled to the first shaft segment 20 and configured to be grasped by a user to hold the string trimmer 10 during operation.

Figure 2:
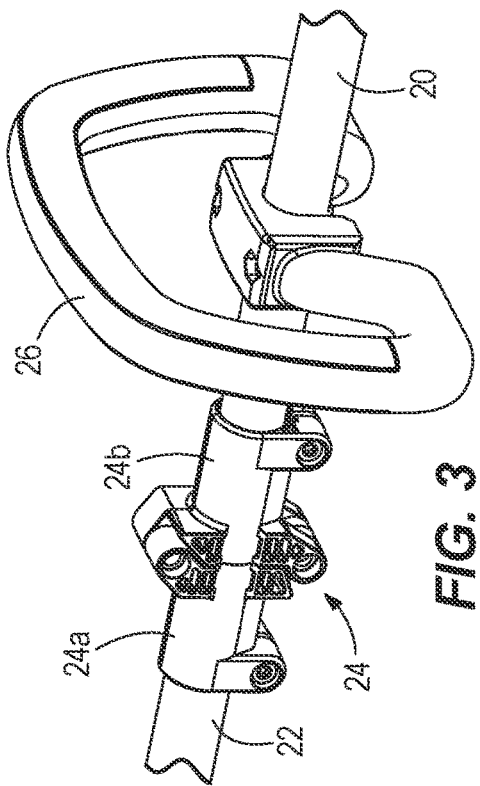
FIG. 2 is a perspective view of a head unit of the string trimmer of FIG. 1.
Figure 7:
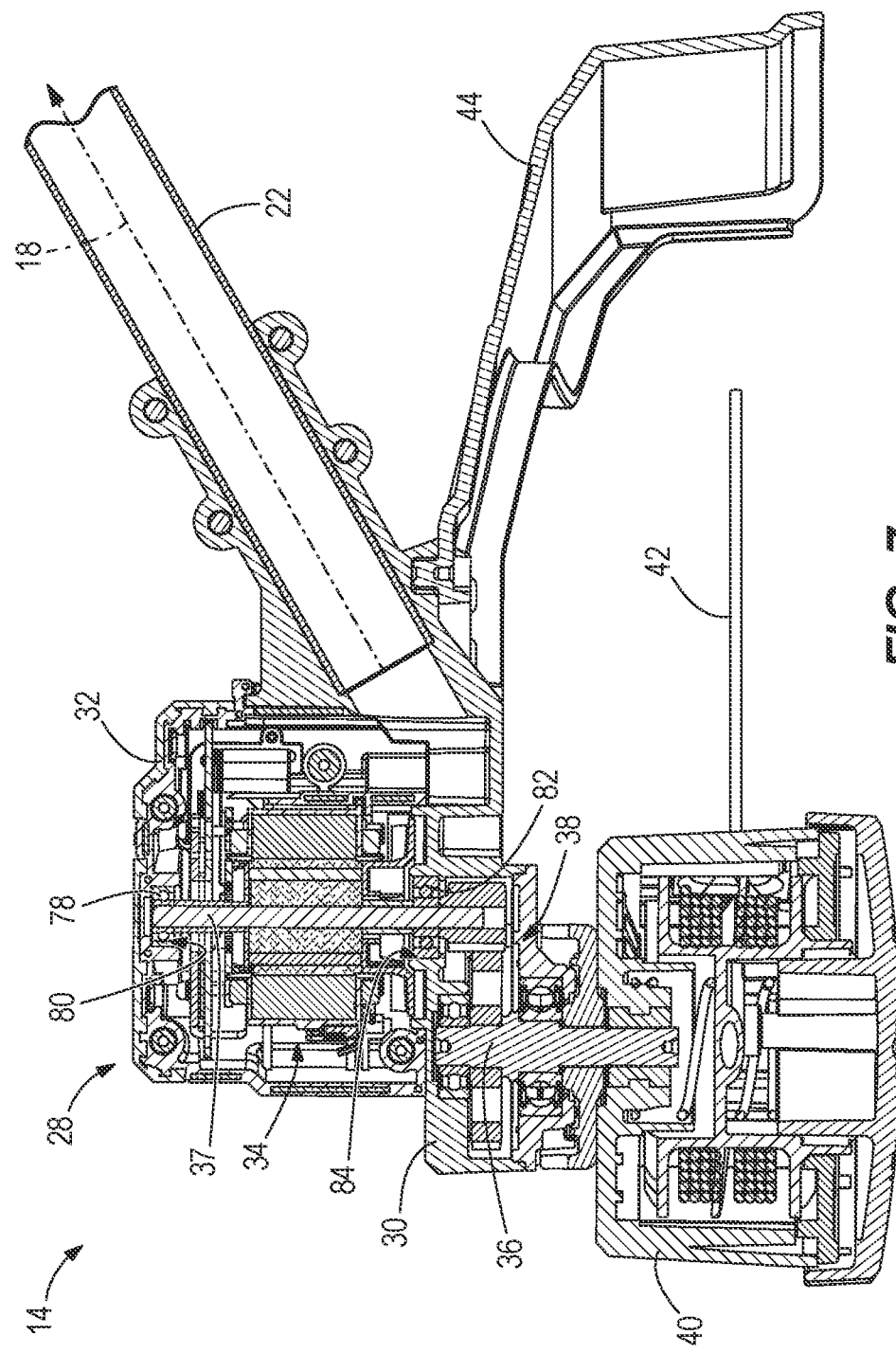
FIG. 7 is a cross-sectional view of the head unit of FIG. 3, taken along line 6-6 of FIG. 1.
Figure 9:
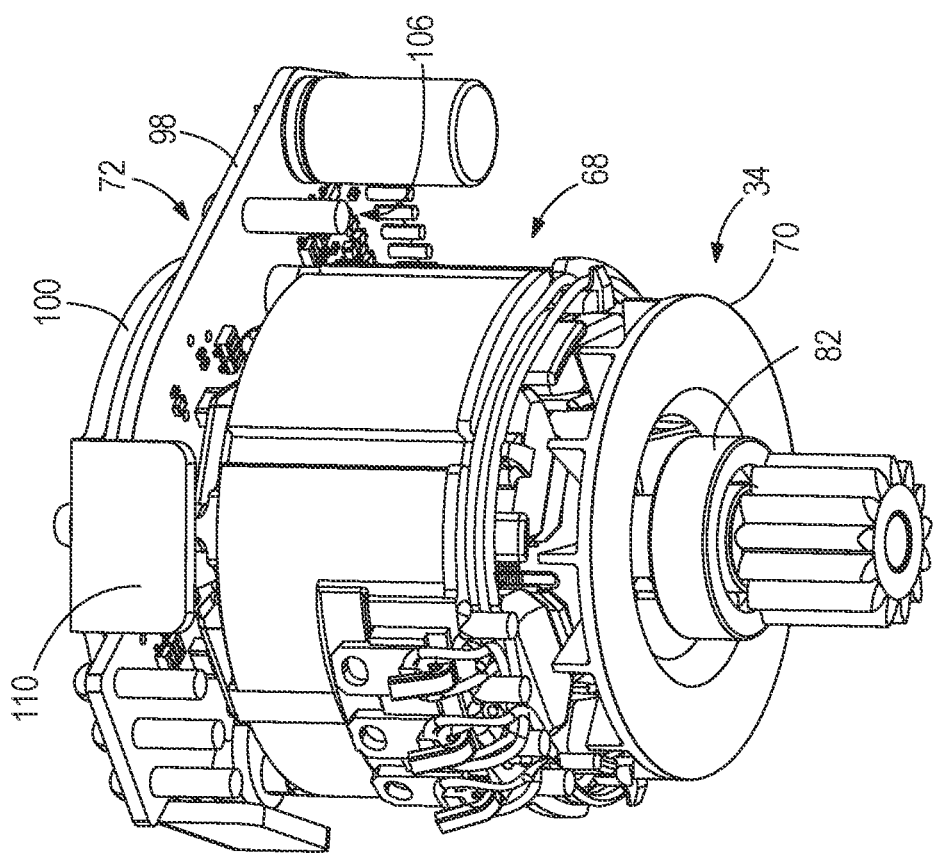
FIGS. 8 and 9 are perspective views of a motor assembly of the string trimmer of FIG. 1.
Figure 8:
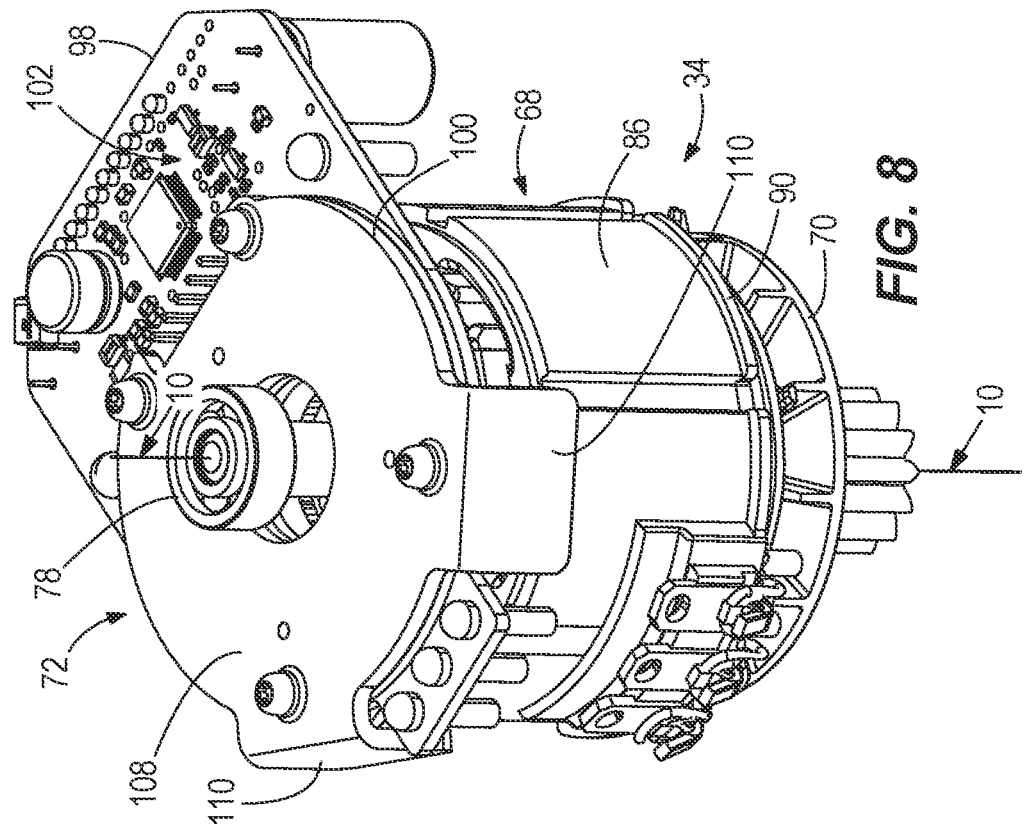

With reference to FIGS. 2 and 7, the head unit 14 includes a head housing assembly 28 comprising a gear case 30 coupled to the second shaft segment 22, and a motor case 32 coupled to the gear case 30. The head unit 14 also includes an electric motor 34 supported within the motor case 32, an output shaft 36 rotatably coupled to a motor shaft 37 of the electric motor 34, and a gear assembly 38 that couples the motor shaft 37 to the output shaft 36 to provide a gear reduction therebetween. The head unit 14 further includes a trimmer head 40 supported on the output shaft 36. A flexible line of string 42 made from a suitable material, e.g., a plastic material such as nylon, is wound within the trimmer head 40 and includes one or more end portions extending outward from the trimmer head 40. As the trimmer head 40 rotates with the output shaft 36, the string 42 serves as a cutting blade, for example, to cut grass, weeds, or other vegetation as desired. The head unit 14 also includes a shroud 44 that protects the user from airborne debris stirred up during operation of the string trimmer 10.

Figure 4:
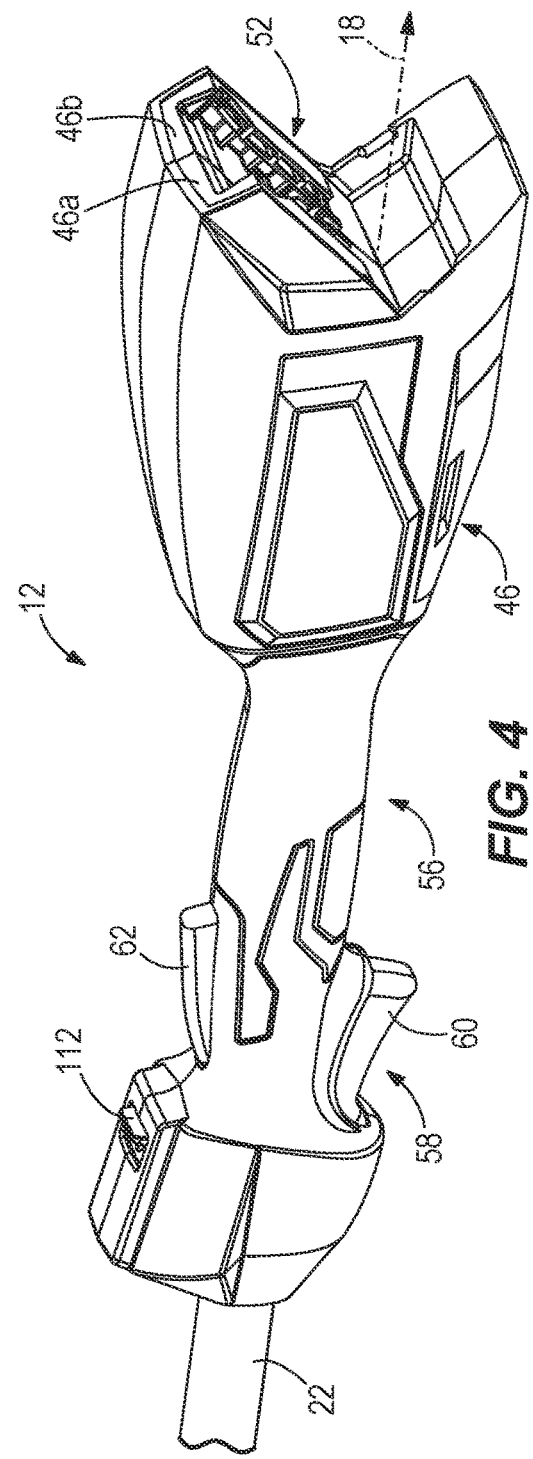
FIG. 4 is a perspective view of a power head of the string trimmer of FIG. 1.

With reference to FIGS. 4-6, the handle unit 12 includes a handle housing assembly 46, which may be formed, as shown in the illustrated construction, of two clamshell housing halves 46a, 46b (FIG. 4). Together, the housing halves 46a, 46b define a compartment 48 (FIG. 6) containing a counterweight 50 and other internal components (e.g., wiring, etc.) of the handle unit 12. The handle housing assembly 46 also includes a battery receptacle 52 configured to selectively mechanically and electrically connect to a rechargeable battery pack (not shown) for supplying power to the string trimmer 10. The handle housing assembly 46 further defines a grip portion 56 (FIG. 4) supporting a trigger assembly 58 operable to selectively electrically connect the power source (e.g., the battery pack) and the motor 34.

With reference to FIGS. 5 and 6, the counterweight 50, in the illustrated embodiment, may comprise a generally cylindrically shaped body and can be formed from any suitable material, e.g., metals, plastics, composites, ceramics, or other materials. Since the motor 34 is located within the head unit 14 (FIG. 7), the counterweight 50 serves to counterbalance or offset the weight of the motor 34, so that the string trimmer 10 is generally balanced about the handle 26. The counterweight 50 is positioned within the handle housing assembly 46 at an end region adjacent the battery receptacle 52, and between the battery receptacle 52 and the grip portion 56. As such, the counterweight 50 generates a moment about the grip portion 56 and the handle 26 to at least partially offset the moments generated by the weight of the head unit 14 about the grip portion 56 and the handle 26. In the illustrated embodiment, the counterweight 50 is positioned generally in-line with the shaft assembly 16, and the counterweight 50 is intersected by the axis 18. By positioning the counterweight 50 in-line with the axis 18 of the shaft assembly 16, the illustrated embodiment prevents the counterweight 50 from acting as an eccentric mass and introducing additional undesired vibrations when the string trimmer 10 is vibrating radially about the axis 18.

With reference to FIG. 5, in the illustrated construction, the trigger assembly 58 may include a "2-motion" trigger assembly 58 with a trigger 60 on one side of the grip portion 56 and a ("shark fin") lock-off member 62 on an opposite side of the grip portion 56. The trigger 60 is operable to actuate a microswitch 64 to selectively activate and deactivate the motor 34 during operation of the string trimmer 10. The lock-off member 62 selectively prevents operation of the trigger 60. Specifically, the lock-off member 62 is pivotable to selectively lock and unlock the trigger 60. In operation, the user first presses the lock-off member 62, thereby freeing the trigger 60, and then presses the trigger 60 to activate the motor 34. If the user attempts to press the trigger 60 without first pressing the lock-off member 62, the trigger 60 is prevented from actuating due to engagement with the lock-off member 62.

FIGS. 8-12 illustrate the motor 34, which includes a rotor assembly 66 affixed to the motor shaft 37, a stator assembly 68 surrounding the rotor assembly 66, a fan 70 coupled to the rotor assembly 66, and a printed circuit board (PCB) assembly 72 coupled to the stator assembly 68. The PCB assembly 72 is coupled to a first end 74 (FIG. 11) of the stator assembly 68, and the fan 70 is located adjacent a second end 76 of the stator assembly 68 opposite the first end 74. The motor shaft 37 is rotatably supported by a first bearing 78 that resides in a first bearing pocket 80 formed in the motor case 32, and is further supported by a second bearing 82 that resides in a second bearing pocket 84 formed in the gear case 30.

Figure 10:
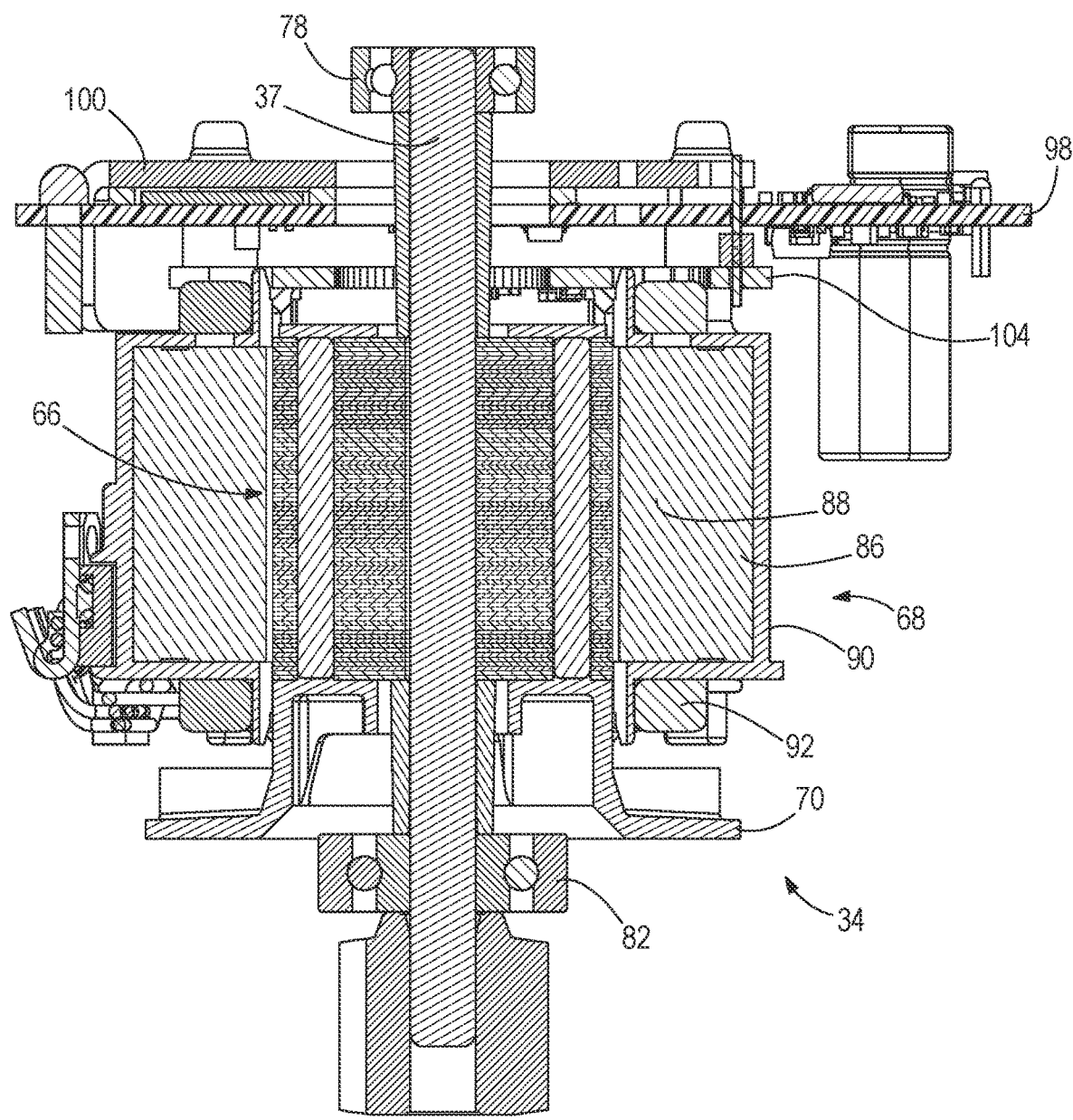
FIG. 10 is a cross-sectional view of the motor assembly of FIG. 8, taken along line 10-10 of FIG. 8.
Figure 11:
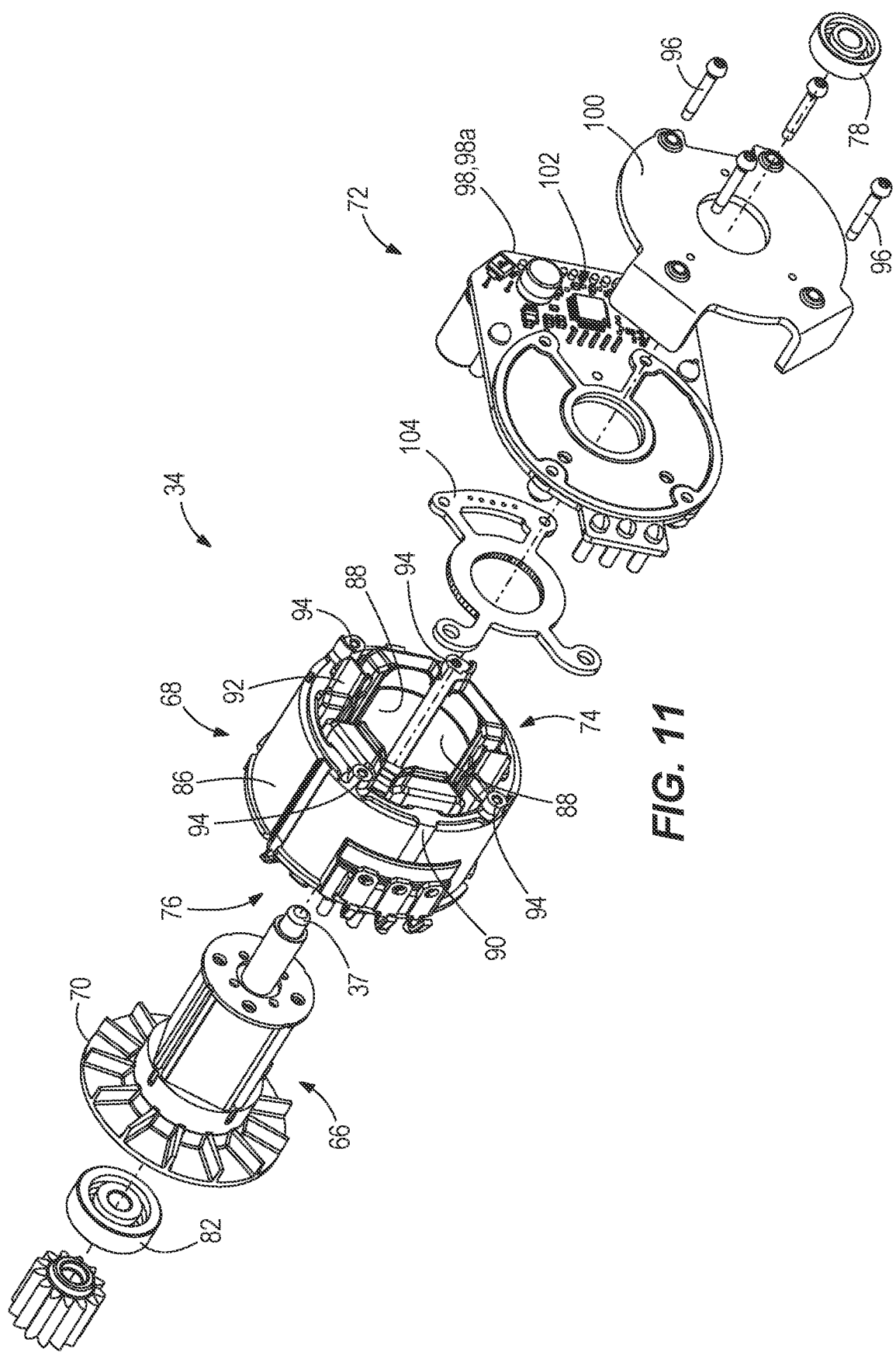
FIGS. 11 and 12 are partially exploded perspective views of the motor assembly of FIG. 8.
Figure 12:
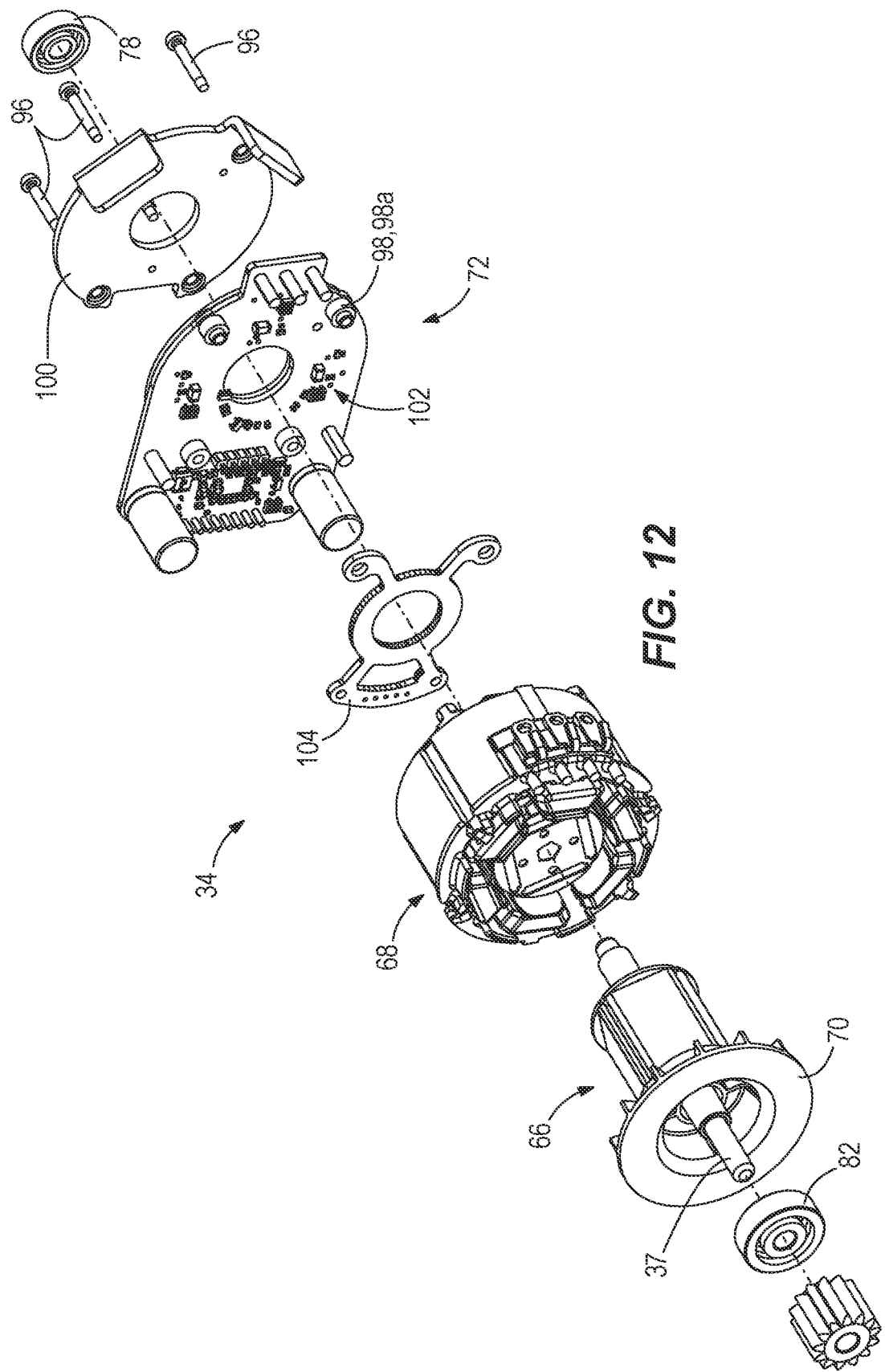

With reference to FIGS. 10-12, the stator assembly 68 includes an annular stator core 86 that defines inwardly extending poles 88, a molded insulator member 90 affixed to the stator core 86, and coils 92 that are wound about the poles 88. The insulator member 90 defines, in the illustrated embodiment, four threaded bosses 94 (FIG. 11) that receive threaded fasteners 96 to secure the PCB assembly 72 to the stator assembly 68. In other embodiments (not shown), in lieu of the threaded bosses, the insulator member 90 may instead include other mounting features (e.g., snap hooks, etc.) for securing the PCB assembly 72 to the stator assembly 68 (e.g., by interference fit or snap fit).

The PCB assembly 72 includes a first PCB 98, a heat sink 100 coupled to a first side 102 of the first PCB 98, and a second PCB 104 coupled to a second side 106 of the first PCB 98 opposite the first side 102. Thus arranged, the second PCB 104 is positioned between the stator assembly 68 and the first PCB 98, and the first PCB 98 is positioned between the second PCB 104 and the heat sink 100.

In the illustrated embodiment, the first PCB 98 comprises a power supply that supplies power to the coils 92, and also comprises a controller 98a that controls operation of the motor 34. The second PCB 104 comprises a Hall effect board that senses an angular position of the rotor assembly 66. The heat sink 100 includes a radial wall 108 that contacts the first PCB 98 to draw away heat therefrom, and also includes axially extending cooling flanges 110 that protrude from an outer circumferential edge of the radial wall 108 and extend generally toward the stator assembly 68. The cooling flanges 110 increase a thermal surface area and mass of the heat sink 100 to improve heat dissipation from the PCB assembly 72.

In many typical electric-powered string trimmers, the electronics (e.g., such as the motor power supply and control circuit boards) are located within the handle unit rather than within the head unit as done with the string trimmer 10. Since the PCB assembly 72 of the illustrated string trimmer 10 is provided in the head unit 14, the PCB assembly 72 is directly exposed to an airflow generated by the fan 70 of the motor 34. This advantageously improves heat dissipation from the PCB assembly 72 and may eliminate a need for an auxiliary cooling mechanism for the PCB assembly 72. In addition, the stacked arrangement of the first PCB 98, the heat sink 100, and the second PCB 104 described above provides a compact configuration for positioning the electronics close to the motor 34 and in direct contact with the airflow generated by the fan 70.

With reference to FIG. 4, the string trimmer 10 includes a mode change shuttle switch 112 located proximate the grip portion 56 and proximate the trigger assembly 58. The mode change shuttle switch 112 is provided sufficiently close to the trigger assembly 58 such that the user may switch between operating modes with one hand, while simultaneously gripping the grip portion 56 and/or operating the trigger assembly 58. In the illustrated embodiment, the mode change shuttle switch 112 is located on a same side of the handle unit 12 as the lock-off member 62, while the trigger 60 is located on an opposite side of the handle unit 12. The mode change shuttle switch 112 is also located forward of the lock-off member 62, i.e., between the lock-off member 62 and the handle 26. The mode change shuttle switch 112 is electrically connected to the first PCB 98, and in particular the controller 98a that controls operation of the motor 34. When the mode change shuttle switch 112 is in a first position, the controller places the string trimmer 10 in a high speed mode. When the mode change shuttle switch 112 is in a second position, the controller 98a places the string trimmer 10 in a low speed mode. The high speed mode corresponds to a relatively fast rotational speed for the trimmer head 40, and the low speed mode corresponds to a relatively slow rotational speed for the trimmer head 40. The controller 98a may receive a logic high or logic low signal from the shuttle switch 112 and selects the low speed mode or the high speed mode based on the signal from the shuttle switch 112.

In operation of the string trimmer 10, the user holds the string trimmer 10 by grasping the grip portion 56 with one hand and by grasping the handle 26 with the other hand, and points the head unit 14 toward the area that is to be trimmed. To begin trimming, the user first presses the lock-off member 62, thereby freeing the trigger 60, and then presses the trigger 60 to activate the motor 34. To switch the string trimmer 10 between the high speed and low speed modes, the user slides the shuttle switch 112 between the first position and the second position.

Various features of the disclosure are set forth in the following claims.

What is claimed is:

1. A string trimmer comprising:
    a handle unit including a handle unit housing that defines a grip portion and a battery receptacle;
    a head unit including a head unit housing, an electric motor, and a rotatable trimmer head;
    a shaft assembly coupling the handle unit to the head unit; and
    a circuit board assembly supported within the head unit housing, the circuit board assembly including a heat sink and a circuit board that comprises a controller configured to control the electric motor,
    wherein the electric motor includes a rotor assembly and a stator assembly surrounding the rotor assembly,
    wherein the circuit board comprises a first circuit board located between the stator assembly and the heat sink, and
    wherein the circuit board assembly further includes a second circuit board located between the first circuit board and the stator assembly.

2. The string trimmer of claim 1, wherein the heat sink comprises a radial wall that contacts the circuit board and a plurality of cooling flanges that extend from an outer circumferential edge of the radial wall toward the stator assembly.

3. The string trimmer of claim 1, wherein the stator assembly includes a stator core and an insulator member, and wherein the circuit board assembly is secured to the insulator member.

4. The string trimmer of claim 1, wherein the second circuit board is configured to detect an angular position of the rotor assembly.

5. The string trimmer of claim 4, wherein the electric motor further includes a plurality of coils, and wherein the first circuit board further comprises a power supply configured to supply power to the coils.

6. The string trimmer of claim 1, wherein the electric motor includes a fan configured to generate an airflow, and wherein the circuit board assembly is exposed to the airflow.

7. A string trimmer comprising:
    a handle unit including a handle unit housing that defines a grip portion and a battery receptacle;
    a head unit including a head unit housing and a rotatable trimmer head;
    a shaft assembly coupling the handle unit to the head unit; and
    an electric motor supported within the head unit housing and configured to rotate the trimmer head, the electric motor including a rotor assembly, a stator assembly surrounding the rotor assembly, and a circuit board assembly coupled to an axial end of the stator assembly;
    wherein the circuit board assembly includes a heat sink, a first circuit board located between the stator assembly and the heat sink, and a second circuit board located between the first circuit board and the stator assembly.

8. The string trimmer of claim 7, wherein the stator assembly includes a stator core and an insulator member, and wherein the circuit board assembly is secured to the insulator member.

9. The string trimmer of claim 7, wherein the second circuit board is configured to detect an angular position of the rotor assembly.

10. The string trimmer of claim 9, wherein the electric motor further includes a plurality of coils, and wherein the first circuit board further comprises a power supply configured to supply power to the coils.

11. The string trimmer of claim 7, wherein the electric motor includes a fan configured to generate an airflow, and wherein the circuit board assembly is exposed to the airflow.

12. The string trimmer of claim 11, wherein the heat sink comprises a radial wall that contacts the first circuit board and a plurality of cooling flanges that extend from an outer circumferential edge of the radial wall toward the stator assembly, and wherein the cooling flanges are exposed to the airflow.

13. A string trimmer comprising:
    a handle unit including a handle unit housing that defines a grip portion and a battery receptacle;
    a head unit including a head unit housing, an electric motor, and a rotatable trimmer head;
    a shaft assembly coupling the handle unit to the head unit; and
    a circuit board assembly supported within the head unit housing, the circuit board assembly including a heat sink and a circuit board that comprises a controller configured to control the electric motor,
    wherein the electric motor includes a rotor assembly and a stator assembly surrounding the rotor assembly,
    wherein the circuit board comprises a first circuit board located between the stator assembly and the heat sink, and wherein the heat sink comprises a radial wall that contacts the circuit board and a plurality of cooling flanges that extend from an outer circumferential edge of the radial wall toward the stator assembly.

14. The string trimmer of claim 13, wherein the shaft assembly extends along an axis between the handle unit and the head unit to couple the handle unit to the head unit, and wherein the string trimmer further comprises a counterweight disposed within the housing between the grip portion and the battery receptacle, wherein the axis intersects the counterweight.

15. The string trimmer of claim 13, wherein the grip portion supports a trigger assembly that includes a trigger and a lock-off member, the trigger being operable to selectively activate the electric motor and the lock-off member being configured to selectively prevent actuation of the trigger, and wherein the trigger is located on a first side of the grip portion and the lock-off member is located on a second side of the grip portion opposite the first side.

16. The string trimmer of claim 13, wherein the circuit board further comprises a second circuit board located between the first circuit board and the stator assembly, wherein the first circuit board comprises a controller configured to control operation of the electric motor, and wherein the second circuit board is configured to detect an angular position of the rotor assembly.

17. The string trimmer of claim 13, wherein the electric motor further includes a plurality of coils, and wherein the first circuit board further comprises a power supply configured to supply power to the coils.

18. The string trimmer of claim 13, wherein the stator assembly includes a stator core and an insulator member, and wherein the circuit board assembly is secured to the insulator member.

19. The string trimmer of claim 13, wherein the electric motor includes a fan configured to generate an airflow, and wherein the circuit board assembly is exposed to the airflow.

20. The string trimmer of claim 19, wherein the cooling flanges are exposed to the airflow.

* * * * *